US008712577B2

(12) United States Patent
Gu et al.

(10) Patent No.: US 8,712,577 B2
(45) Date of Patent: Apr. 29, 2014

(54) ELECTRONIC SYSTEM AND METHOD FOR COMPENSATING THE DIMENSIONAL ACCURACY OF A 4-AXIS CNC MACHINING SYSTEM USING GLOBAL AND LOCAL OFFSETS

(75) Inventors: Jie Gu, Clarkston, MI (US); Sheri K. Kurgin, Macomb, MI (US); Paula J. Deeds, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 13/032,860

(22) Filed: Feb. 23, 2011

(65) Prior Publication Data

US 2012/0215342 A1 Aug. 23, 2012

(51) Int. Cl.
- *G05B 19/401* (2006.01)
- *G06F 7/66* (2006.01)
- *G05B 19/402* (2006.01)

(52) U.S. Cl.
USPC ........... 700/192; 700/193; 700/194; 700/195; 700/176; 700/186; 409/131; 702/152; 702/153; 702/94

(58) Field of Classification Search
USPC .......................................... 700/192, 193–194
See application file for complete search history.

(56) References Cited

U.S. PATENT DOCUMENTS

| | | | | |
|---|---|---|---|---|
| 4,382,215 A * | 5/1983 | Barlow et al. | ............. | 318/568.1 |
| 4,819,339 A * | 4/1989 | Kunzmann et al. | ............. | 33/503 |
| 5,125,035 A * | 6/1992 | McCarthy et al. | ............. | 382/141 |
| 5,696,687 A * | 12/1997 | DeMotte et al. | ............. | 700/114 |
| 6,192,283 B1 * | 2/2001 | Holowko | ............. | 700/28 |
| 6,311,098 B1 * | 10/2001 | Higasayama et al. | ........ | 700/159 |
| 6,681,145 B1 * | 1/2004 | Greenwood et al. | .......... | 700/193 |
| 6,912,446 B2 * | 6/2005 | Wang et al. | .................... | 700/193 |
| 7,283,889 B2 * | 10/2007 | Otsuki et al. | .................. | 700/186 |
| 7,599,813 B2 * | 10/2009 | Grupp | ........................ | 702/152 |
| 8,554,502 B2 * | 10/2013 | Hon et al. | .................... | 702/95 |
| 2001/0016786 A1 * | 8/2001 | Takahashi et al. | ............. | 700/195 |
| 2001/0045021 A1 * | 11/2001 | Matsuda et al. | ................ | 33/502 |

(Continued)

FOREIGN PATENT DOCUMENTS

| | | |
|---|---|---|
| WO | 2004033147 A2 | 4/2004 |
| WO | 2008035952 A1 | 3/2008 |

OTHER PUBLICATIONS

Bohez, "Compensating for Systematic errors in %-Axis NC machining", 2002, pp. 391-403.*

(Continued)

*Primary Examiner* — Ryan A. Jarrett
*Assistant Examiner* — Olvin Lopez Alvarez
(74) *Attorney, Agent, or Firm* — Quinn Law Group, PLLC

(57) ABSTRACT

An electronic system for compensating the dimensional accuracy of a 4-axis CNC machining system includes a CNC machining system configured to machine a plurality of features into a part, a dimensional measuring device configured to measure a plurality of dimensions of the part, and to provide an output corresponding to the measured dimensions and a compensation processor in communication with the CNC machining system and dimensional measuring device. The CNC machining system includes a global coordinate system, and at least one feature being defined relative to a local coordinate system that is translated from the machine coordinate system. Additionally, the compensation processor is configured to receive the output from the dimensional measuring device, to calculate a plurality of CNC offsets, including at least one local offset, and to provide the offsets to the CNC machining system.

19 Claims, 6 Drawing Sheets

(56) References Cited

U.S. PATENT DOCUMENTS

| | | | |
|---|---|---|---|
| 2003/0158622 A1* | 8/2003 | Corey | 700/193 |
| 2008/0184579 A1* | 8/2008 | McFarland | 33/551 |
| 2008/0243416 A1* | 10/2008 | Bryll | 702/95 |
| 2009/0076655 A1* | 3/2009 | Blondel et al. | 700/254 |
| 2009/0112357 A1* | 4/2009 | Hammond et al. | 700/194 |
| 2009/0183610 A1* | 7/2009 | Maxted et al. | 82/1.11 |
| 2010/0018069 A1* | 1/2010 | Ould et al. | 33/503 |
| 2010/0274381 A1* | 10/2010 | Gray et al. | 700/181 |
| 2011/0213479 A1* | 9/2011 | Wahlsten et al. | 700/97 |
| 2012/0130531 A1* | 5/2012 | Gu et al. | 700/193 |
| 2012/0213604 A1* | 8/2012 | Gu et al. | 409/131 |
| 2012/0215341 A1* | 8/2012 | Gu et al. | 700/173 |

OTHER PUBLICATIONS

Zhu et al, "Machining Accuracy Improvement of Five-Axis Machine Tools by Geometric Error Compensation", 2010, pp. 348-352.*

Sartori et al, "Geometric error measurement and compensation of machines", 1995, pp. 599-609.*

* cited by examiner

US 8,712,577 B2

ELECTRONIC SYSTEM AND METHOD FOR COMPENSATING THE DIMENSIONAL ACCURACY OF A 4-AXIS CNC MACHINING SYSTEM USING GLOBAL AND LOCAL OFFSETS

TECHNICAL FIELD

The present invention relates generally to a system and method for computing global and local offsets for a 4-axis CNC machine.

BACKGROUND

Computer numerical controlled (CNC) machining systems are typically used in industrial settings to accurately machine parts according to previously defined plans. Often these plans are developed in a computer aided design package, and may be represented in the form of engineering drawings. A CNC machining system may operate according to an assembled sequence of commands (e.g., G code) that instruct the system to machine a part by moving a controllable cutting tool. During the operation, the system may monitor the real-time position of the part and tool, and may control its position relative to the part via precise servomotor control. The part may be held or clamped within a fixture, which is in-turn positioned on a machine table.

SUMMARY

An electronic system for compensating the dimensional accuracy of a CNC machining system includes a CNC machining system configured to machine a plurality of features into a part, a dimensional measuring device configured to measure a plurality of dimensions of the part, and to provide an output corresponding to the measured dimensions, and a compensation processor in communication with the CNC machining system and dimensional measuring device. The CNC machining system has a plurality of coordinate systems and local offsets, and at least one feature is assigned to a local offset. The compensation processor is configured to receive the output from the dimensional measuring device, calculate a plurality of CNC offsets, including at least one local offset, and provide the offsets to the CNC machining system. In an embodiment, the dimensional measuring device is a coordinate measuring machine, and the CNC machining system is a 4-axis CNC mill.

The compensation processor may be configured to calculate a plurality of CNC offsets by computing a plurality of deviations between the measured dimensions of the part and a corresponding nominal dimension, translating the deviations from the coordinate measuring machine ("CMM") coordinate systems to the machine coordinate system of the CNC machining system, and determining a plurality of CNC offsets that minimize future deviations. Furthermore, the compensation processor may weight a deviation according to a weighting algorithm, such as by dividing the deviation by a provided tolerance.

The compensation processor may determine values for the plurality of CNC offsets that minimize future deviations by calculating a global offset, analytically applying the global offset to a derived system of simultaneous equations relating the deviations to the machine coordinate system and calculating remaining deviations; and calculating a local offset from the remaining deviations. In an embodiment, the global offset may be calculated by optimizing a plurality of global CNC offset variables within the set of simultaneous equations. Furthermore, the processor may iterate through a sequence of the global and local offset calculations.

An electronic method for compensating the dimensional accuracy of a CNC machining system includes receiving setup information through an interface, receiving measurement data from a coordinate measuring machine through an interface, calculating a plurality of CNC offsets from the setup information and measurement data, and outputting the plurality of CNC offsets. The setup information may include feature descriptive information and part information, and the measurement data may relate to one or more measured dimensions of a machined part. The feature descriptive information may likewise include a plurality of feature records, where each feature record corresponds to a respective feature machined by a CNC machining system.

In an embodiment, the plurality of CNC offsets may include a global offset and a local offset. The global offset may include, for example, a table offset, fixture offset, or angular offset. Additionally, the local offset may be configured and assigned to features with a tight dimensional tolerance.

The feature descriptive information may include a plurality of feature records, where each feature record corresponds to a respective feature machined by a CNC machining system.

Calculating a plurality of CNC offsets may include computing one or more feature deviations from the measurement data and the feature descriptive information, translating the feature deviations from the CMM coordinate systems to a plurality of global CNC offset variables within a coordinate system of a CNC machining system; and optimizing the global CNC offset variables to minimize the feature deviations. Additionally, a weighting algorithm may be applied to the one or more feature deviations to modify the influence of a dimension when optimizing the global CNC offset variables. The weighting algorithm may, for example, divide a computed feature deviation by a tolerance received from the feature descriptive setup information.

Translating the feature deviations to a plurality of global CNC offset variables may include developing a set of redundant simultaneous equations, and blanking an equation that does not bear on the final solution. Additionally, calculating a plurality of CNC offsets may further include analytically applying the optimized global offset variables to a derived system of simultaneous equations and calculating remaining deviations; and calculating a local offset variable from the remaining deviations. Furthermore, the method may further include iterating through a sequence of global and local offset calculations.

The above features and advantages and other features and advantages of the present invention are readily apparent from the following detailed description of the best modes for carrying out the invention when taken in connection with the accompanying drawings.

DETAILED DESCRIPTION

Figure 1:
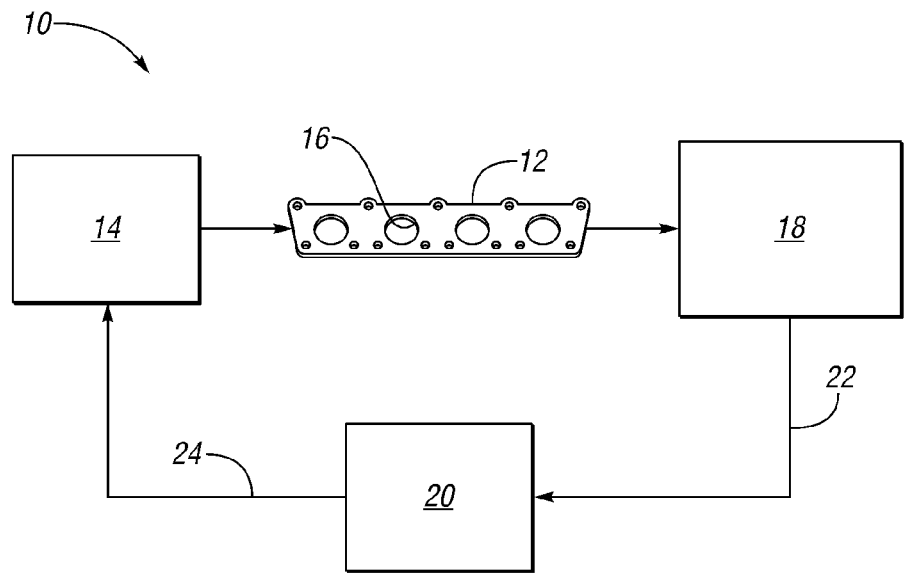
FIG. 1 is a schematic diagram of a system for compensating the dimensional accuracy of a machined part.

Referring to the drawings, wherein like reference numerals are used to identify like or identical components in the various views, FIG. 1 illustrates an exemplary system 10 for compensating the dimensional accuracy of a machined part 12. As shown, the system 10 may include a computer numerical controlled (CNC) machining system 14 that may create one or more features on a part (e.g., hole 16) through one or more machining processes. In an embodiment, the CNC machining system 14 may include a CNC mill, such as, for example, a 4-axis mill, and may perform processes such as cutting, face milling, boring, honing, and/or drilling.

Once the one or more features are machined into the part 12, a coordinate measuring machine (CMM) 18 may measure one or more dimensions of the part 12. Each measured dimension may be taken with respect to an established datum or control surface that may be specified in a corresponding engineering drawing of the part 12. The engineering drawing may specify a nominal dimension for each measurement, and may further provide acceptable tolerances.

The system 10 may further include a compensation processor 20 that may receive part measurement data 22 from the CMM 18, and compute one or more CNC global and/or local offsets 24. The compensation processor 20 may include, for example and without limitation, a COMP (Capability Optimization for Machining Process) software package that may aid in computing the one or more CNC offsets 24. Once computed, the CNC offsets 24 may be loaded into the CNC machining system 14 to enhance the dimensional accuracy of the machining process.

Figure 2:
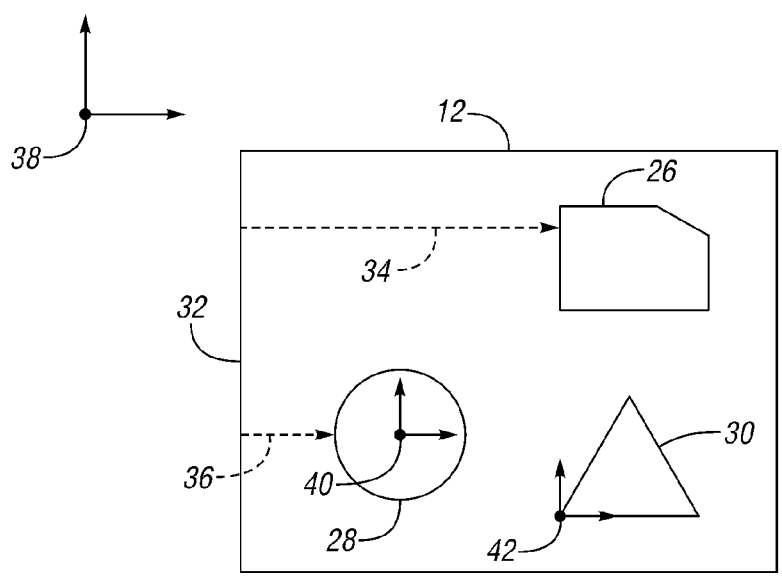
FIG. 2 is a schematic top view of of a part having a plurality of features.

As generally illustrated in FIG. 2, a part 12 may include a plurality of features 26, 28, 30. Each feature may be machined by a CNC machining system 14 according to an engineering drawing. Exemplary features may include, without limitation, holes, bores, channels, and/or machined faces. Each machined feature may be positioned with respect to one or more datum or control surfaces. For example, the distance between feature 26 and an edge 32 may define a first dimension 34. Similarly, the distance between feature 28 and the edge 32 may define a second dimension 36.

When a dimension of one or more machined features (e.g., dimensions 34, 36) deviates from the nominal dimensions provided in the drawing, offsets provided by the compensation processor 20 may modify the machining process and attempt to reduce the deviation. In an embodiment, two types of offsets may be available to reduce deviations: global offsets; and/or local offsets.

A global offset may adjust the origin and/or orientation of a global or machine coordinate system 38. This type of offset may affect the dimensions of all features 26, 28, 30 in the part 12. In this regard, the global offset may be similar to a rigid body shift or rotation of the part 12.

Conversely, a local offset may selectively adjust a feature or group of features by modifying the nominal dimensions/ positioning of only that feature. As shown in FIG. 2, some features 26, 28, 30 may have nominal positions defined relative to their local centers or coordinate systems 40, 42, which may in-turn be positioned relative to the machine coordinate system 38. Therefore, the local offset may adjust the nominal position of features' local centers 40, 42 within the machine coordinate system 38, without affecting other features.

Even though the global offset is a rigid body motion, it can adjust the workpiece coordinate system to an optimal place so that the feature deviations are minimized. One type of deviation that may require correction may result from elastic deformation during the machining process. For example, if the part 12 is not sufficiently rigid to resist clamping forces and/or cutting tool pressure during the machining process, the part 12 may elastically deform during certain machining processes. Once the forces are removed, the part 12 may return to an undeformed state and shift any feature that was machined while the part was deformed. The global offset calculated by the compensation processor 20 may provide a median correction so that the total part deviations are minimized. An exemplary metric representing the total part deviation may include the standard deviation of the difference between each measured dimension and its respective provided nominal dimension. There may, however, be a residual deviation that remains after the global offset adjustment is applied. The residual deviation may not be acceptable for features with a tight tolerance. A local offset may allow the deviation of that particular feature to be adjusted (i.e., during machining) so that it is accurately positioned once any elastic loading is removed.

Figure 3C:
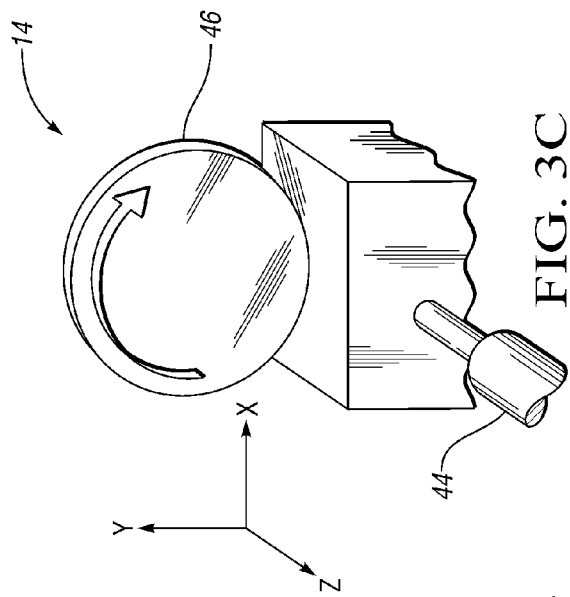
FIG. 3C is a schematic perspective view of a 4-axis CNC mill with a C-table.
Figure 3B:
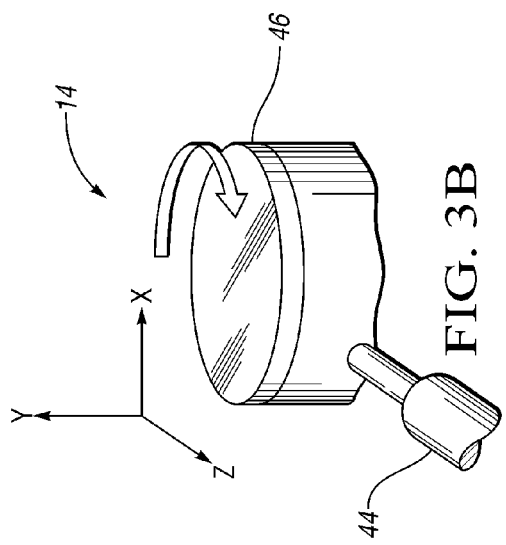
FIG. 3B is a schematic perspective view of a 4-axis CNC mill with a B-table.
Figure 3A:
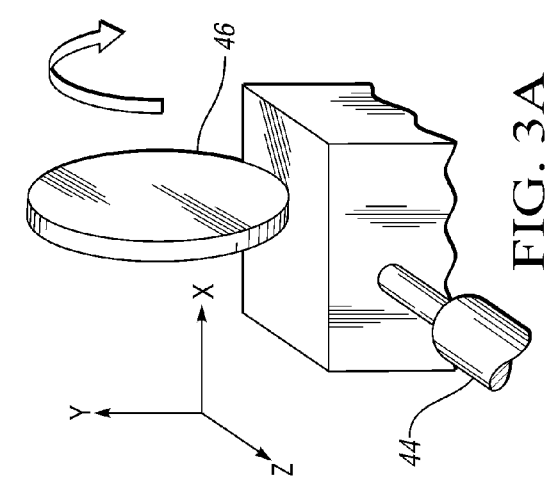
FIG. 3A is a schematic perspective view of a 4-axis CNC mill with an A-table.

As illustrated in FIGS. 3A-3C, in some industrial settings, CNC machines may be configured to provide four or more axes of control. For example, FIG. 3A generally illustrates a 4-axis "A" CNC machine, FIG. 3B generally illustrates a 4-axis "B" CNC machine, and FIG. 3C generally illustrates a 4-axis "C" CNC machine. In each illustrated embodiment, the cutting spindle 44 may be capable of three degrees of translation, and the table 46 may be capable of one degree of rotation. As may be appreciated, the control of additional table axes may complicate the computation of global and/or local offsets.

Figure 4:
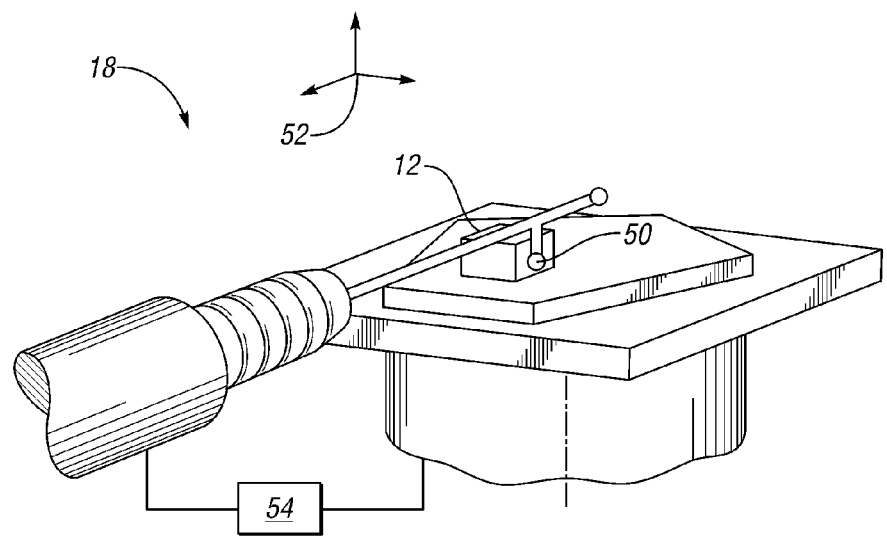
FIG. 4 is a schematic perspective view of a coordinate measuring machine.

FIG. 4 illustrates an embodiment of a CMM 18. As known in the art, a CMM 18 may include a probe 50 that may be numerically located in three dimensional space 52 by a measurement processor 54. The probe 50 may be moved into physical contact with the part 12, at which time the measurement processor 54 may record a three-dimensional position. By comparing multiple recorded positions, the measurement processor 54 may report one or more distances or dimensions of the part 12.

Figure 5:
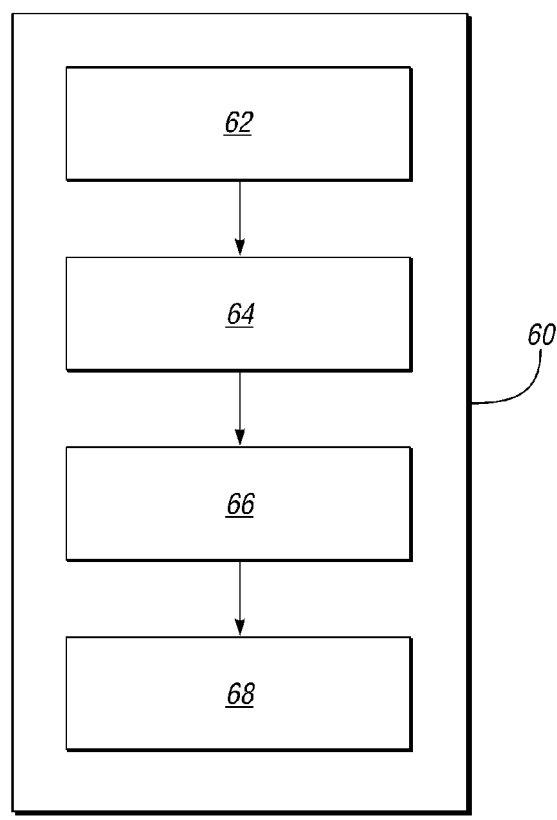
FIG. 5 is a flow diagram of an embodiment of a computerized method for calculating CNC calibration offsets from CMM measurement data.

FIG. 5 illustrates an embodiment of a computerized method 60 for calculating CNC calibration offsets 24 from CMM measurement data 22. The computerized method 60 may be performed in conjunction with or by a compensation processor 20, such as illustrated in FIG. 1. In an embodiment, the computerized method 60 may include providing setup information (Step 62), loading CMM measurement data (Step 64), calculating offsets (Step 66), and outputting offsets and/or performance data (Step 68).

Figure 6:
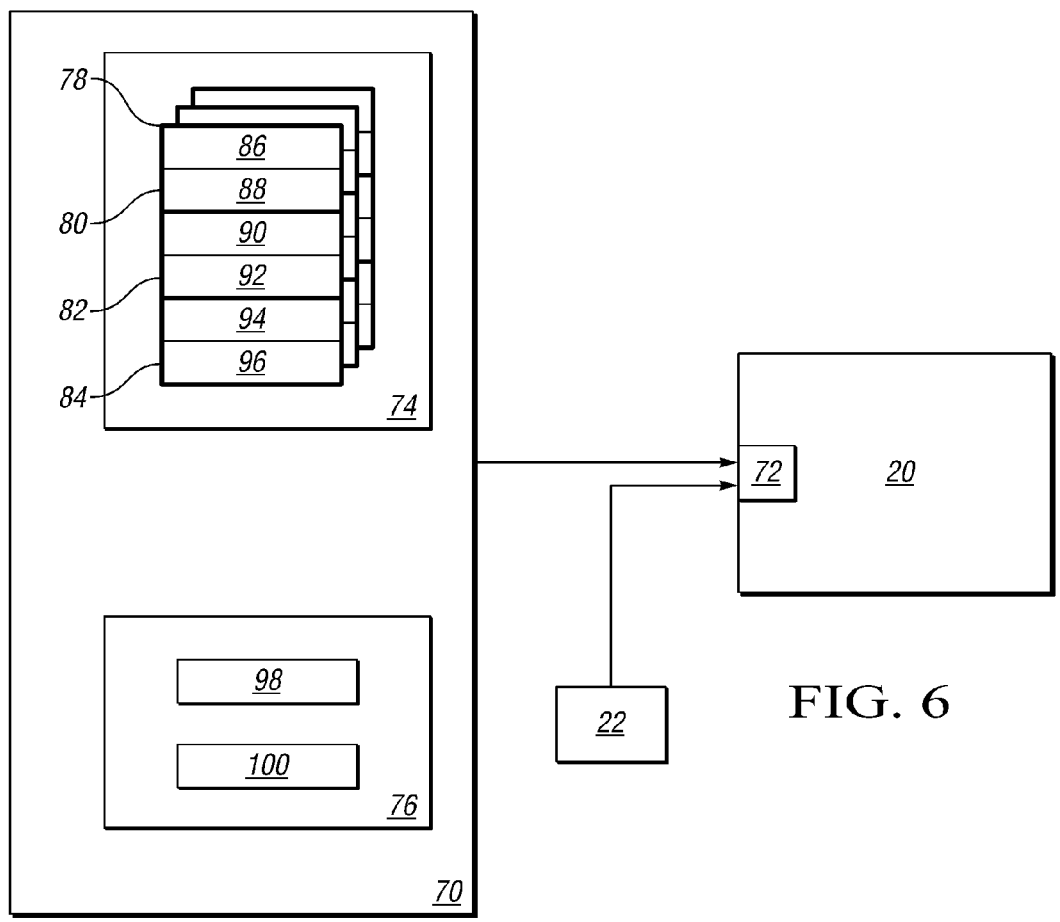
FIG. 6 is a diagram of setup information and CMM data being provided to an interface of a compensation processor.

In Step 62, as illustrated in FIG. 6, the setup information 70 may be provided to the compensation processor 20 via an interface 72. Exemplary types of setup information 70 may include feature descriptive information 74 and part information 76. The interface 72 may include a computer terminal configured to receive entry of the setup information 70 from an operator. In another embodiment, the interface 72 may be an electronic interface where the setup information 70 may be uploaded directly to the processor 20.

In an embodiment, feature descriptive information 74 may include a plurality of feature records 78 that each correspond to a respective feature machined by the CNC machining system 14. Each feature record 78 may include, for example, feature identifying information 80, dimensioning information 82, and/or feature orienting information 84. Exemplary feature identifying information 80 may include a descriptive title for each feature 86 and/or a CMM identifier code 88. Exemplary dimensioning information 82 may include a nominal dimensional value 90 that may be specified for the feature and/or a dimensional tolerance 92. Exemplary orienting information 84 may include the orientation 94 of the CNC table 46 when the respective feature is machined and/or the orientation 96 of the part within the CMM 18 when the dimensional measurement is taken.

Part information 76 may include information that may locate the part 12 within the machine coordinate space. Exemplary part information may include table position information 98 and/or fixture position information 100.

Referring again to FIG. 5, once the setup information is provided to the compensation processor 20 in Step 62, measurement data 22 from the CMM 18 may be loaded into the processor 20 (Step 64). In an embodiment, the measurement data 22 may include raw measurements acquired by the CMM 18 that correspond to nominal dimensions 90 provided for the feature in the feature descriptive setup information 74. The measurement data 22 may be loaded via the interface 72 by manually entering it into a computer terminal. Alternatively, the measurement data 22 may be electronically uploaded to the compensation processor 20.

In an embodiment, the measurement data 22 may represent measurements taken from a statistical sample of multiple parts 12. While data 22 from only one part 12 may allow the compensation processor 20 to properly calculate CNC offsets 24, data 22 obtained from a sample of multiple parts may allow the compensation processor 20 to more completely account for statistical deviations attributable to the machining process.

Figure 7:
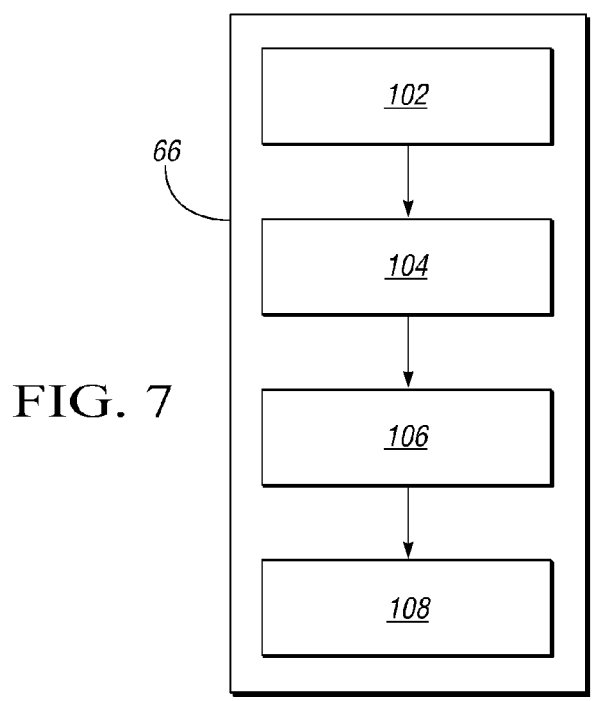
FIG. 7 is a flow diagram of an embodiment of a computerized method for calculating CNC calibration offsets.

Once the setup information and CMM data are loaded into the compensation processor 20 (i.e., Steps 62, 64), the processor may compute one or more CNC offsets (Step 66) that may be used by the CNC machining system 14 to reduce any deviation between the actual feature positions (as measured by the CMM 18) and the nominal dimensional value 90 provided in the feature descriptive information 74. As illustrated in FIG. 7, in an exemplary embodiment, the step of computing one or more CNC offsets (Step 66) may include: translating the CMM measurement data 22 from the CMM coordinate systems to a coordinate system of the CNC machine (Step 102); developing a set of equations that relate feature deviations and available offsets (Step 104); weighting the one or more features of the part 12 according to a degree of significance (Step 106); and optimizing offset variables to minimize total feature deviations from the nominally specified dimensions (Step 108).

Figure 8:
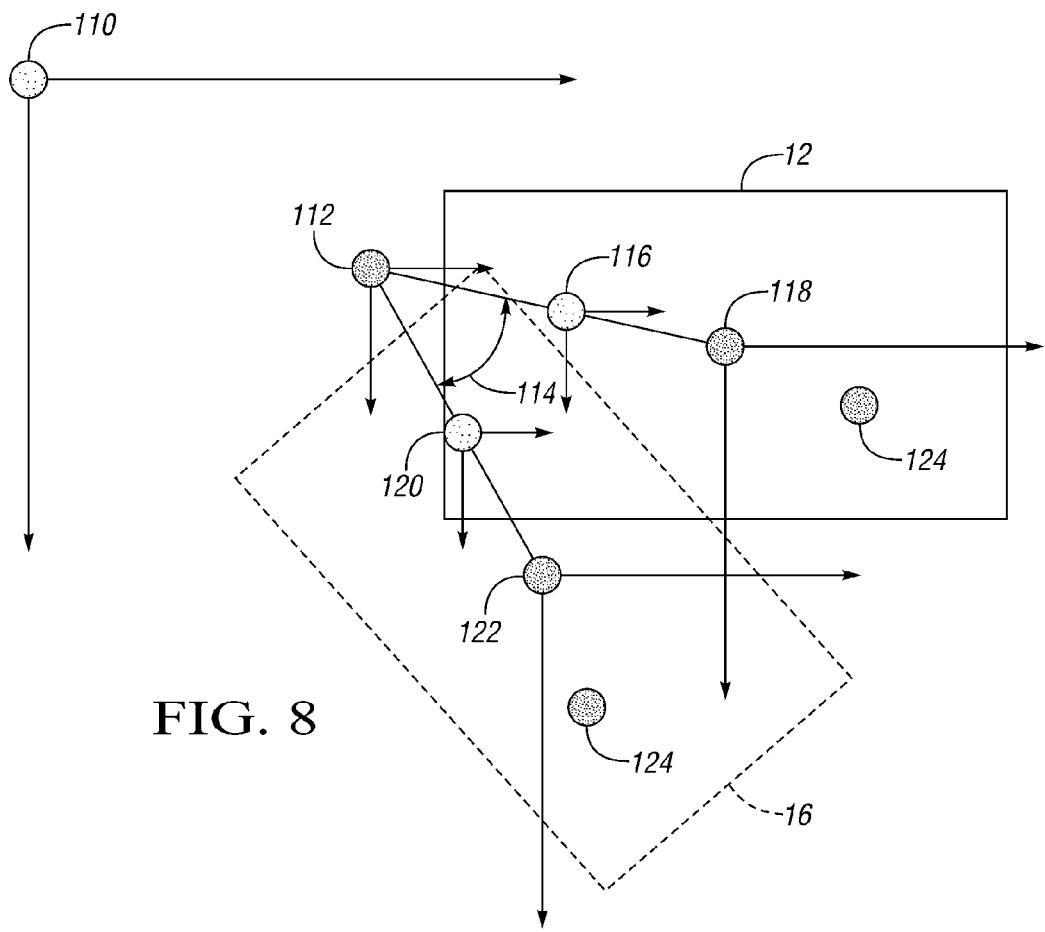
FIG. 8 is a schematic diagram of a plurality of reference coordinate systems within a CNC machining system.
Figure 9:
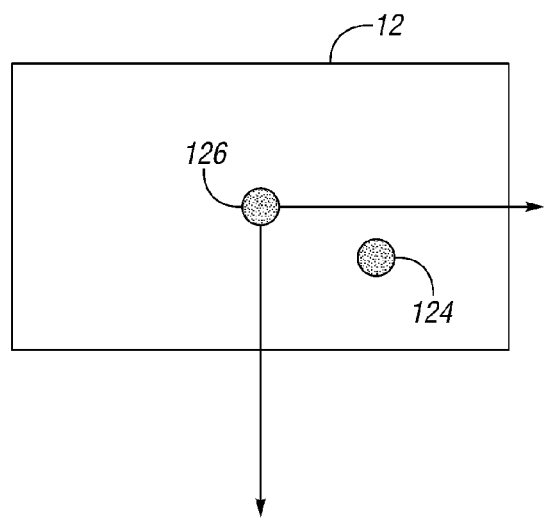
FIG. 9 is a schematic diagram of a reference coordinate systems within a coordinate measuring machine.

As illustrated in FIGS. 8-9, the CNC machining system 14 and CMM 18 may each have native, independent coordinate systems (i.e., coordinate systems 110, 126 respectively). As illustrated in FIG. 8, the absolute machine coordinate system "M" 110 of the CNC machining system 14 may be a stationary coordinate system with its origin as the machine home and its positive directions set as the machine way directions. In an embodiment, the CMM 18 may record each measurement as GD&T (geometric dimensioning and tolerancing) values aligned with the arbitrary CMM coordinate system 126.

Referring again to FIG. 8, the origin of a table coordinate system "T" 112 may be aligned on the rotational center of the machine table 46 (as shown in FIGS. 3A-3C). The origin of the T system 112 may be translated a distance from the origin of the M system 110, though may be orientated in a similar manner as the M system 110. Additionally, the table 46 may be capable of rotating about the table center (e.g., the origin of the T system 112) through a variable angle "B" 114.

In an embodiment, a fixture may be positioned on the table 46 and used to locate and restrain a part 12. The fixture may have a corresponding fixture coordinate system "F" 116 that is located at the center of the fixture. The F system 116 may be translated a distance from the table center, though may also be oriented in a similar manner as the M system 110 and the T system 112.

A part 12 may be rigidly clamped to the fixture. The part 12 may have a corresponding part coordinate system "P" 118 that is located at the center of the part 12, and aligned with the M system 110. In an embodiment, the origin of the P system 118 may be translated a distance from the origin of the F system 116. As the table 46 rotates about its center through an angle B 114, the fixture and part 12 will similarly rotate about the table center. As illustrated, following a rotation, the origin of the F system 116 (i.e., the fixture center) will assume a new position 120, within the M system 110, and, similarly, the origin of the P system (i.e., the part center) will assume a new position 122. By definition, however, the orientation of the P, F, and T systems 118, 116, 112 may remain aligned with the orientation of the M system 110. The F system 116 may also be referred to as the global coordinate system. Using these exemplary relationships, Equation 1 may be used to define the part center (i.e., origin of the P system 118) within the machine system "M" 110, where the table is oriented on the X-Z plane (i.e., a "B" table).

$$\vec{M}_{global\_B} = \begin{cases} Wx = (Tx_B) + (Fx_0 + Px_0)\cos B - (Fz_0 + Pz_0)\sin B \quad \text{Equation 1} \\ Wy = Ty_B + Fy_0 + Py_0 \\ Wz = (Tz_B) + (Fx_0 + Px_0)\sin B + (Fz_0 + Pz_0)\cos B \\ Wb = B \end{cases}$$

As used in Equation 1, the point $(Tx_B, Ty_B, Tz_B)$ represents the nominal center of the B-Table (i.e. the origin of the T system 112), as measured from the machine zero (i.e., the origin of the M system 110). Similarly, the point $(Fx_0, Fy_0, Fz_0)$ represents the distance between the fixture center (i.e., origin of the F system 116) and the table center when table angle B=0; and, $(Px_0, Py_0, Pz_0)$ represents the distance between the part center (i.e., origin of the P system 118) and the fixture center when table angle B=0.

As illustrated in FIGS. 8-9, a feature 124 may be machined into the part 12 by a tool. As illustrated in FIG. 8, as the part 12 moves through an angle "B" 114, the feature 124 may move within the P, F, and T systems 118, 116, 112, though is inherently fixed on the part 12.

As illustrated in FIG. 9, the CMM coordinate system 126 may be defined on the part 12 and may maintain a constant orientation with respect to the part. Therefore, as the part 12 rotates through an angle B 114, the CMM coordinate system 126 may likewise rotate. In this manner, the position of the feature 124 within the CMM coordinate system 126 may remain constant. In an embodiment, the CMM coordinate system 126 may be positioned on the part center, and may be aligned with the machine coordinate system 110 when B=0. Given this exemplary coordinate definition, Equation 2 may represent the location of the feature 124 within the machine coordinate system 110, where $(X_{cmm}, Y_{cmm}, Z_{cmm})$ may represent the position of the feature 124 within the CMM coordinate system 126.

Equation 2

$$\vec{M}_{global\_B\_feature} =$$

$$\begin{cases} Wx = (Tx_B) + (Fx_0 + Px_0 + X_{cmm})\cos B - (Fz_0 + Pz_0 + Z_{cmm})\sin B \\ Wy = Ty_B + Py_0 + Y_{cmm} \\ Wz = (Tz_B) + (Fx_0 + Px_0 + X_{cmm})\sin B + (Fz_0 + Pz_0 + Z_{cmm})\cos B \\ Wb = B \end{cases}$$

In an embodiment, the location of the table $(Tx_B, Ty_B, Tz_B)$ and/or the part $(Px_0, Py_0, Pz_0)$ may be offset within the machine coordinate system 110 to correct deviations between the CMM measured location of a feature, and the nominal location of the feature specified by an engineering drawing. Similarly, the angular rotation of the table B may offset to correct deviations. Equation 3 represents the position of a feature within the machine global coordinate system 110 (as identified in Equation 2), though including offsets ($\Delta Tx_B$, $\Delta Tz_B$), ($\Delta Px_0$, $\Delta Py_0$, $\Delta Pz_0$), and $\Delta B$. The global coordinate system 110 may be defined using, for example, the G54 or G55 commands within the CNC code commonly referred to as "G-Code."

Equation 3
$$\vec{M}_{global\_B\_feature} = \begin{cases} Wx = (Tx_B + \Delta Tx_B) + (Fx_0 + Px_0 + X_{cmm} + \Delta Px_0)\cos B - (Fz_0 + Pz_0 + Z_{cmm} + \Delta Pz_0)\sin B \\ Wy = Ty_B + Py_0 + Y_{cmm} + \Delta Py_0 \\ Wz = (Tz_B + \Delta Tz_B) + (Fx_0 + Px_0 + X_{cmm} + \Delta Px_0)\sin B + (Fz_0 + Pz_0 + Z_{cmm} + \Delta Pz_0)\cos B \\ Wb = B + \Delta B \end{cases}$$

Partial derivatives may be used to solve for the linear and/or angular offsets, as demonstrated in Equations 4-5.

$$\Delta \vec{M}_{global\_B\_feature\_linear} = \frac{\partial \vec{M}_{global\_B\_feature}}{\partial T}\Delta T + \frac{\partial \vec{M}_{global\_B\_feature}}{\partial P_0}\Delta P_0 \quad \text{Equation 4}$$

$$\Delta \vec{M}_{global\_B\_feature\_angular} = \frac{\partial \vec{M}_{global\_feature}}{\partial B}\Delta B \quad \text{Equation 5}$$

As can be seen in Equation 6, CNC convention may define the linear adjustment in an opposite direction as the CMM deviation, where the angular adjustment may be in the same direction as the CMM deviation. As shown in Equation 7, the total feature deviation, as expressed in the machine coordinate system "M" 110, may be the sum of the linear and angular deviations.

$$\Delta \vec{M} = -\Delta \vec{M}_{global\_feature\_linear} + \Delta \vec{M}_{global\_feature\_angular} \quad \text{Equation 6}$$

Combining Equations 3-6 may result in Equation 7:

Equation 7

$$\Delta \vec{M} = \begin{cases} -\Delta Tx_B - \Delta Px_0 \cos B + \Delta Pz_0 \sin B - (Fx_0 + Px_0 + X_{cmm})\sin B \Delta B - (Fz_0 + Pz_0 + Z_{cmm})\cos B \Delta B \\ \Delta Y_{global} = -\Delta Py_0 \\ \Delta Z_{global} = -\Delta Tz_B - \Delta Px_0 \sin B - \Delta Pz_0 \cos B + (Fx_0 + Px_0 + X_{cmm})\cos B \Delta B - (Fz_0 + Pz_0 + Z_{cmm})\sin B \Delta B \end{cases}$$

While Equation 7 is helpful in describing feature deviation in a global, machine coordinate system 110, measurement of the feature deviation occurs in the CMM coordinate system 126. Therefore, through a coordinate transformation, Equation 7 may be written in CMM space as shown in Equations 8-10, where Equation 10 is the compensation formula for an embodiment of a 4-axis B machine global offset.

$$\begin{pmatrix} \Delta X_{cmm} \\ \Delta Y_{cmm} \\ \Delta Z_{cmm} \end{pmatrix} = \begin{pmatrix} \vec{i}_{cmm}\cdot\vec{i}_{global} & \vec{i}_{cmm}\cdot\vec{j}_{globalc} & \vec{i}_{cmm}\cdot\vec{k}_{global} \\ \vec{j}_{cmm}\cdot\vec{i}_{global} & \vec{j}_{cmm}\cdot\vec{j}_{global} & \vec{j}_{cmm}\cdot\vec{k}_{global} \\ \vec{k}_{cmm}\cdot\vec{i}_{global} & \vec{k}_{cmm}\cdot\vec{j}_{global} & \vec{k}_{cmm}\cdot\vec{k}_{global} \end{pmatrix} \begin{pmatrix} \Delta X_{global} \\ \Delta Y_{global} \\ \Delta Z_{global} \end{pmatrix} \quad \text{Equation 8}$$

$$\begin{pmatrix} \Delta X_{cmm} \\ \Delta Y_{cmm} \\ \Delta Z_{cmm} \end{pmatrix} = \quad \text{Equation 9}$$

$$\begin{pmatrix} \cos B & 0 & \sin B \\ 0 & 1 & 0 \\ -\sin B & 0 & \cos B \end{pmatrix} \begin{pmatrix} \begin{bmatrix} -\Delta Tx_B - \Delta Px_0 \cos B + \Delta Pz_0 \sin B - \\ (Fx_0 + Px_0 + X_{cmm})\sin B \Delta B - \\ -(Fx_0 + Pz_0 + Z_{cmm})\cos B \Delta B \end{bmatrix} \\ -\Delta Py_0 \\ \begin{bmatrix} -\Delta Tz_B - \Delta Px_0 \sin B - \Delta Pz_0 \cos B + \\ (Fx_0 + Px_0 + X_{cmm})\cos B \Delta B - \\ (Fz_0 + Pz_0 + Z_{cmm})\sin B \Delta B \end{bmatrix} \end{pmatrix}$$

$$\begin{pmatrix} -\Delta X_{cmm} \\ -\Delta Y_{cmm} \\ -\Delta Z_{cmm} \end{pmatrix} = \begin{pmatrix} \Delta Tx_B \cos B + \Delta Tz_B \sin B + \Delta Px_0 + \Delta B(Fz_0 + Pz_0 + Z_{cmm}) \\ \Delta Py_0 \\ -\Delta Tx_B \sin B + \Delta Tz_B \cos B + \Delta Pz_0 - \Delta B(Fx_0 + Px_0 + X_{cmm}) \end{pmatrix} \quad \text{Equation 10}$$

Equation 10 may be re-written as a linear matrix, as shown in Equation 11.

Equation 11

$$-\begin{pmatrix} \Delta X_{cmm} \\ \Delta Y_{cmm} \\ \Delta Z_{cmm} \end{pmatrix} = \begin{pmatrix} \cos B & \sin B & 1 & 0 & 0 & Fz_0 + Pz_0 + Z_{cmm} \\ 0 & 0 & 0 & 1 & 0 & 0 \\ -\sin B & \cos B & 0 & 0 & 1 & -Fx_0 - Px_0 - X_{cmm} \end{pmatrix} \begin{pmatrix} \Delta Tx_B \\ \Delta Tz_B \\ \Delta Px_0 \\ \Delta Py_0 \\ \Delta Pz_0 \\ \Delta B \end{pmatrix}$$

As used in Equation 11, each element within the coefficient matrix on the right side of the equation may be determined from the setup information 70 (illustrated in FIG. 6) provided to the compensation processor 20 in Step 62. The left side of Equation 11 represents the difference between a CMM measured dimension for a particular feature and the nominal dimension specified in an engineering drawing. In this exemplary embodiment, the feature deviations are represented in a CMM coordinate system 126 that is aligned with the machine coordinate system 110 when B=0.

The part 12 may include one or more features that do not lend themselves to be easily measured with reference to CMM coordinate system 126. For example, the part 12 may include several features that are dimensioned from various datum. Due to operator or machine convenience and/or accessibility, the part 12 may need to be physically manipulated to obtain the corresponding CMM measurements. In such a case, the compensation processor 20 may need to translate all measurements back into the common CMM coordinate system 126 (which may also be aligned with the global, machine coordinate system 110 when B=0). In an embodiment, the translation from a measurement in an independently oriented coordinate system to a measurement in the CMM reference frame may require a rotational transformation. As known in the art such a rotational transformation may be assembled through a series of 1-3 discrete rotations about one or more axes of the initial coordinate system. Exemplary rotational transforms may include ZYZ or ZYX rotations.

While Equation 11 may describe the global correction/offset for a single feature, in practice a part 12 may include a plurality of features that may each require varying degrees of correction. The compensation processor 20 may use Equation 11 a plurality of times to describe each measured dimension for each respective feature. Referring again to FIG. 7, in Step 104, the processor may assemble all generated equations into a redundant set of simultaneous equations. This set may relate all measured feature deviations back to the six available offsets. This set of equations may likewise account for measurements from more than one part 12 (i.e., from a statistical sample of parts).

Once the set of simultaneous equations is assembled, the compensation processor 20 may subsequently eliminate, or "blank," any equations that may not bear on the final solution. For example, if one of the plurality of features is incomplete or undefined, the equations describing that particular feature may be eliminated from the set.

Once a corresponding set of simultaneous equations is developed that describes all of the intended features, the processor 20 may apply a weighting algorithm to the various equations and/or features (Step 106). The weighting algorithm may increase the influence of more critical features when solving for the global offsets. For example, a feature with a tighter tolerance may be weighted higher than a feature with a more generous tolerance. In an embodiment, the weighting algorithm may operate by dividing both sides of Equation 11 by that particular feature's dimensional tolerance 92. As such, features with a smaller tolerance will be weighted more significantly In Step 108 the compensation processor 20 may determine values for the six offset variables that minimize the feature deviations described in the set of redundant equations. Such a determination may occur via an optimization routine that may choose offset variables which may minimize the expressed deviations. Exemplary optimization routines may include a least square fit solver, a linear programming optimization routine, or other numerical optimization methods.

In an embodiment, prior to performing any optimization the solver may check the system for the existence of singularities. If the solver detects that a singularity is likely to exist, the processor 20 may alert the user and/or modify the equation set to eliminate or "blank" additional problematic equations.

Figure 10:
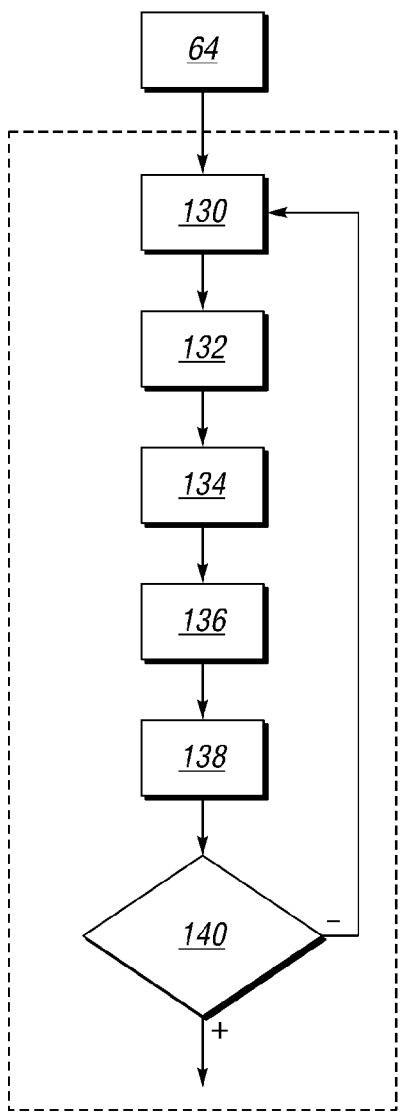
FIG. 10 a flow diagram of an embodiment of a computerized method of computing one or more CNC offsets that includes solving for optimal global offsets and computing one or more local offsets.

In addition to computing global offsets 24, as described above with reference to FIG. 7, the compensation processor 20 may further be configured to compute one or more local feature offsets. As illustrated in FIG. 10, in an embodiment, the step of computing one or more CNC offsets 24 (Step 66 from FIG. 5) may include first solving for optimal global offsets (as generally described above), and subsequently computing one or more local offsets to improve any residual feature deviations. The compensation processor 20 may iterate through one or more series of global-local offset computations until, for example, the incremental change is smaller than a threshold amount.

Equation 12 represents an embodiment of how the local offset may be programmed within the CNC tool path using G-Code. In the first line, the G54 command calls the global offset, and in the second line, the G90G01 command defines the tool path, with $(n_x, n_y, n_z)$ specifying the nominal dimensions of the feature, and $(\Delta x, \Delta y, \Delta z)$ specifying the local offsets for the feature.

$$G54$$
$$G90G01 \quad X[n_x + \Delta x]Y[n_y + \Delta y]Z[n_z + \Delta z]$$

Equation 12

After the global offsets are augmented, there may still be a residual deviation that may exist for one or more features. The deviation may initially be expressed in one or more CMM coordinate systems, depending on how the deviations were measured. To be useful, however, the deviation may be translated from the various CMM coordinate systems to a common CMM coordinate system. The common CMM coordinate system may be oriented along the machining coordinate system 110 when the table angular position is zero. In an embodiment, the feature deviation measured in the initial CMM coordinate system may be represented as $(Dx_{r\_CMM}, Dy_{r\_CMM}, Dz_{r\_CMM})$ and the feature deviation in the common CMM coordinate system may be represented as $(Dx_{r\_com}, Dy_{r\_com}, Dz_{r\_com})$. Therefore, Equation 13 may represent the translation of the feature deviation from the initial CMM coordinate system to the common CMM coordinate system, where $M_{CMM=>com}$ represents a transformation matrix.

$$\begin{pmatrix} Dx_{r\_com} \\ Dy_{r\_com} \\ Dz_{r\_com} \end{pmatrix} = M_{CMM=>com} \begin{pmatrix} Dx_{r\_CMM} \\ Dy_{r\_CMM} \\ Dz_{r\_CMM} \end{pmatrix}$$

Equation 13

As discussed above, the deviations may need to be translated from the common CMM coordinate system to the CNC global coordinate system 110, within which the part is machined. In some instances, this translation may need to account for the directionality of the table rotation, which need not always follow the right-hand rule. Therefore, Equation 14 may be used to express the feature deviations and/or needed adjustments $(Ax_{r\_glo}, Ay_{r\_glo}, Az_{r\_glo})$ in the global coordinate system 110. If there is only one part 12 that has a single feature, the adjustment may be considered a local offset. If there is more than one feature on multiple parts, the local offset may be the weighted average of all adjustments.

$$\begin{pmatrix} Ax_{r\_glo} \\ Ay_{r\_glo} \\ Az_{r\_glo} \end{pmatrix} = -\begin{pmatrix} \cos B & 0 & -\sin B \\ 0 & 1 & 0 \\ \sin B & 0 & \cos B \end{pmatrix} M_{CMM=>com} \begin{pmatrix} Dx_{r\_CMM} \\ Dy_{r\_CMM} \\ Dz_{r\_CMM} \end{pmatrix}$$

Equation 14

As may be appreciated, Equations 1-14 are shown for exemplary purposes. While these equations represent global offsets for a 4-Axis CNC system with a B-table, one skilled in the art may similarly develop equations that represent offsets for other table configurations (e.g., 4-axis A-tables and/or C-tables).

With reference to FIG. 10, an embodiment of the process for computing one or more CNC offsets 24 (Step 66) may include: calculating a global offset from CMM data received in Step 64 (Step 130); analytically applying the global offsets to the derived system equations and calculating remaining deviations (Step 132); calculating a local offset for one or more features (Step 134); calculating residual deviations and adding them to the nominal dimensions (Step 136); accumulating the incremental global and local offsets 130, 134 for overall global and local offsets (Step 138); and iterating if the incremental change to the offsets is not below a threshold (Step 140).

The calculation of incremental global offsets (Step 130) may be similar to the process described with respect to FIG. 7, and may include relating the residual deviation data, as provided by the CMM measurements 22 to a coordinate system of the CNC machine (Step 102); developing a set of equations that relate feature deviations and available offsets (Step 104); weighting the one or more features of the part 12 according to a degree of significance (Step 106); and/or optimizing offset variables to minimize total feature deviations from the nominally specified dimensions (Step 108).

Once the incremental global offsets are determined, the compensation processor 20 may determine the deviations that are expected to exist for each feature after the table, part, and/or angular attributes have been augmented by the calculated incremental global offsets (i.e., Step 132). Then, on a feature-by-feature basis, the compensation processor 20 may use these remaining deviations to calculate the incremental local offsets.

Where multiple features and parts share common attributes within a reference frame, the local offset may be calculated as a weighted average of the residual deviations over the multiple features and parts. In an embodiment, the weighted average may be determined by dividing each deviation by the dimension's corresponding tolerance. As such, a feature with a smaller tolerance will have more importance in the weighted average than a feature with a larger tolerance.

Once the incremental global and local offsets are computed, they may be added to any previous offsets in Step 138. At this point, the compensation processor may examine whether the incremental changes to the offsets are below a given threshold amount (Step 140), and re-compute the global offsets (Step 130) if they are not. An exemplary threshold amount for the incremental change may be 0.001.

Referring back to FIG. 5, once the global and/or local offsets are calculated (Step 66), the compensation processor 20 may output them to the CNC machining system 14, and may further output various forms of performance data to the user. Depending on the level of integration between the compensation processor 20 and the CNC machining system 14, the offsets 24 may be either directly provided to the CNC machining system 14, or may be displayed for a technician to enter them manually. In either embodiment, the offsets 24 may serve to adjust one or more coordinate systems defined within the CNC code. As described above, the global offsets that may be derived from, for example, an optimization routine, and may serve to may adjust the position and/or orientation of the part 12 as a whole. Other local offsets may be derived by the compensation processor 20 that may individually adjust one or more local features of the part 12.

Figure 11:
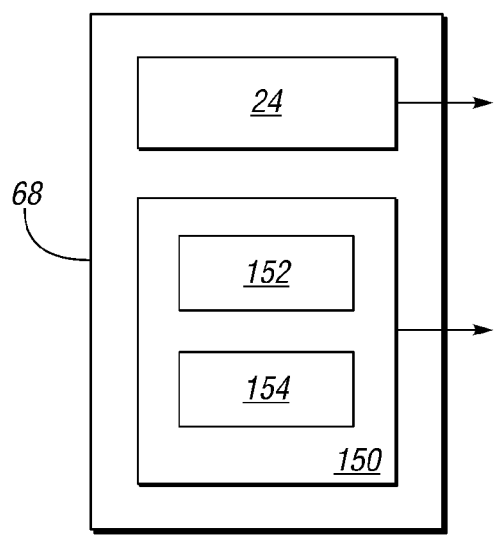
FIG. 11 is a flow diagram of output data being provided by a compensation processor.

As illustrated in FIG. 11, in addition to outputting the various CNC offsets 24, the compensation processor 20 may also compute and provide performance data 150 to the user. The performance data 150 may summarize and/or compare the deviations before and after the corrections, and may be summarized in tabular form 152 and/or graph form 154. In an embodiment, the performance data 150 may analyze the changes in feature deviations as a percent of the provided tolerance for that feature. The performance data 150 may report the changes on a feature-by-feature basis and/or as an average deviation for the part.

While the best modes for carrying out the invention have been described in detail, those familiar with the art to which this invention relates will recognize various alternative designs and embodiments for practicing the invention within the scope of the appended claims All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. An electronic system for compensating the dimensional accuracy of a CNC machining system comprising:
    a CNC machining system configured to machine a plurality of features into a part, the CNC machining system having a global coordinate system and a local coordinate system translated from the global coordinate system, and at least one feature being defined relative to the local coordinate system;
    a dimensional measuring device configured to measure a plurality of dimensions of the part, and to provide an output corresponding to the measured dimensions; and
    a compensation processor in communication with the CNC machining system and dimensional measuring device, the compensation processor configured to:
        receive the output from the dimensional measuring device;
        calculate a plurality of CNC offsets, wherein calculating the plurality of CNC offsets includes:
            calculating a global offset, wherein the global offset is an adjustment of a position or orientation of the global coordinate system; and
            calculating a local offset after calculating the global offset, wherein the local offset is an adjustment of a position or orientation of the local coordinate system within the global coordinate system after the global coordinate system has been adjusted in accordance with the global offset; and
        provide the CNC offsets to the CNC machining system.

2. The electronic system of claim 1, wherein the dimensional measuring device is a coordinate measuring machine.

3. The electronic system of claim 2, wherein calculating the plurality of CNC offsets includes computing a plurality of deviations between the measured dimensions of the part and a corresponding nominal dimension; translating the deviations to the global coordinate system of the CNC machining system; and determining the plurality of CNC offsets based on the deviations.

4. The electronic system of claim 3, wherein calculating the plurality of CNC offsets further includes weighting at least one of the deviations according to a weighting algorithm.

5. The electronic system of claim 4, wherein the weighting algorithm includes dividing the deviation by a provided tolerance.

6. The electronic system of claim 3, wherein determining the plurality of CNC offsets comprises:
    analytically applying the global offset to a derived system of simultaneous equations that relate the deviations to the global coordinate system and calculating remaining deviations; and
    calculating the local offset from the remaining deviations.

7. The electronic system of claim 6, wherein the global offset is calculated by optimizing a plurality of global CNC offset variables within the set of simultaneous equations.

8. The electronic system of claim 6, wherein determining the plurality of CNC offsets further includes iterating through a sequence of global and local offset calculations.

9. An electronic method for compensating the dimensional accuracy of a CNC machining system comprising:

receiving setup information through an interface, the setup information including feature descriptive information and part information, the feature descriptive information including a local coordinate system, and the part information including a global coordinate system;

receiving measurement data from a coordinate measuring machine and through an interface, the measurement data relating to one or more measured dimensions of a machined part;

calculating a plurality of CNC offsets from the received setup information and measurement data, wherein calculating the plurality of CNC offsets includes:
calculating a global offset, wherein the global offset is an adjustment of a position or orientation of the global coordinate system; and
calculating a local offset after calculating the global offset, wherein the local offset is an adjustment of a position or orientation of the local coordinate system within the global coordinate system after adjusting the position or orientation of the global coordinate system in accordance with the global offset; and outputting the plurality of CNC offsets.

10. The electronic system of claim 9, wherein the global offset includes a table offset, part offset, or angular offset.

11. The electronic method of claim 9, wherein the feature descriptive information includes a plurality of feature records, each feature record corresponding to a respective feature machined by a CNC machining system.

12. The electronic method of claim 9, wherein calculating the plurality of CNC offsets includes:
computing one or more feature deviations from the measurement data and the feature descriptive information;
relating the feature deviations to a plurality of global CNC offset variables within the global coordinate system of the CNC machining system; and
optimizing the global CNC offset variables to minimize the feature deviations.

13. The electronic method of claim 12, wherein calculating the plurality of CNC offsets further includes applying a weighting algorithm to the one or more feature deviations, the weighting algorithm configured to modify the influence of a dimension when optimizing the global CNC offset variables.

14. The electronic method of claim 13, wherein the weighting algorithm divides a feature deviation by a tolerance received in the feature descriptive setup information.

15. The electronic method of claim 12, wherein calculating the plurality of CNC offsets further includes:
analytically applying the optimized global offset variables to a derived system of simultaneous equations and calculating remaining deviations; and
calculating a local offset variable from the remaining deviations.

16. The electronic method of claim 15, wherein calculating the plurality of CNC offsets further includes iterating through a sequence of global and local offset calculations.

17. The electronic method of claim 12, wherein relating the feature deviations to the plurality of global CNC offset variables includes developing a set of redundant simultaneous equations.

18. The electronic method of claim 17, further comprising blanking an equation that does not bear on a final solution.

19. An electronic system for compensating the dimensional accuracy of a CNC machining system comprising:
a four axis CNC mill configured to machine a feature into a part, the four axis CNC mill having a global coordinate system;
a coordinate measuring machine configured to measure a plurality of dimensions of the part, and to provide an output corresponding to the measured dimensions; and
a compensation processor in communication with the four axis CNC mill and coordinate measuring machine, the compensation processor being configured to:
receive setup information that includes a plurality of nominal dimensions, each nominal dimension corresponding to a measured dimension of the part, wherein the setup information further includes feature descriptive data including a nominal position of a feature of the part;
receive the output from the coordinate measuring machine;
calculate a plurality of CNC offsets; and
provide the plurality of CNC offsets to the four axis CNC mill; and
wherein calculating the plurality of CNC offsets comprises:
computing a plurality of deviations between the measured dimensions and the corresponding nominal dimensions;
relating the plurality of deviations to a plurality of global CNC offset variables within the global coordinate system of the four axis CNC mill;
optimizing the global CNC offset variables to minimize the deviations;
analytically computing at least one remaining deviation of the plurality of deviations after optimizing the global CNC offset variables, wherein the at least one remaining deviation is the deviation that remains after optimizing the global CNC offset variables; and
computing a local offset to minimize the at least one remaining deviation after optimizing the global CNC offset variables, wherein the local offset is an adjustment of the nominal position of the feature within the global coordinate system.

* * * * *